Oct. 21, 1969  J. H. BYRNES ET AL  3,473,270
WHEEL GRINDER
Filed March 27, 1967  5 Sheets-Sheet 1

Fig.1.

INVENTORS
JAMES H. BYRNES
FLORIAN B. CUNY.
BY
ATTORNEY

United States Patent Office 3,473,270
Patented Oct. 21, 1969

3,473,270
WHEEL GRINDER
James H. Byrnes, Orinda City, and Florian B. Cuny, Lafayette, Calif., assignors to Westoak Machine Corporation, Oakland, Calif., a corporation of California
Filed Mar. 27, 1967, Ser. No. 626,000
Int. Cl. B24b 21/00, 23/06
U.S. Cl. 51—147                                   15 Claims

ABSTRACT OF THE DISCLOSURE

The disclosure relates to a combination of means for supporting the car wheels of a transit car or railway car or engine above the rails on which it normally rides, a pivotally mounted abrasive belt assembly comprising a rotatable contact wheel and a rotatable abrasive belt trained over said contact wheel, means for rotating said contact wheel and said abrasive belt, means for rotating at least one of said car wheels and means for lifting said contact wheel and said abrasive belt into engagement with the tread of said one overlying freely rotating car wheel and for simultaneously applying pressure upon said contact wheel to pressure-grind the tread of said car wheel to a roundness concentric with the shaft bearings in which said car wheel is journaled.

---

The invention, in general, relates to means for eliminating uneven surfaces from metal objects. More particularly, the invention relates to a machine for smoothing the tread or rail engaging surfaces of wheels of transit and railway cars and of engines without dismantling the wheels thereof.

While devices heretofore have been devised for grinding car wheels while the wheels are in operative positions on the cars, the relatively high costs of manufacture and of maintenance of such prior devices have made it virtually prohibitive to purchase and use the same, especially by municipalities across the country which own and operate transit lines. With the current development of high speed transit and rail lines, the car wheels must be maintained in a smooth round condition in order to minimize noise and vibration. Since high speed is actually a function of smooth car wheels, equipment is now required for regular maintenance use. Also, as a result of out of round wheels, passenger discomfort on most transit and railway cars is relatively high because such uneven wheels cause heavy pounding on rails, loud and vexatious noise, as well as undue vibration and rattling which is engendered. In addition to the appreciably high cost of prior devices and equipment for smoothing out of round car wheels, a relatively large replacement expense is involved with the use of such prior devices because the operating cutting tools of such equipment take such a deep cut into the wheel on each smoothing thereof that the diameter of the car wheel becomes rapidly less and less so that the wheel must be discarded long before the actual or normal life thereof, and replaced with a new car wheel. It is perhaps well known that flat spots are created on the treads of car wheels through the most normal of circumstances such as starting, stopping, braking, and wet or icy rails, all contributing to the out of round surfaces which must constantly be obviated.

In addition to the foregoing disadvantages, almost if not all prior devices employed for grinding car and engine wheels require the continuous application of a liquid coolant at the areas of grinding to dissipate developed heat, which applications not only add to the expense of operations but also renders working conditions messy and extremely uncomfortable. Our invention is directed to the provision of a relatively inexpensive wheel grinding machine which obviates all of the disadvantages of prior equipment, which can be quickly set up for operation, and which accomplishes the smoothing out of uneven surfaces on car and engine wheels in a minimum of time without waste so as to insure the maximum longevity of use of each wheel.

A primary object of the present invention is to provide an improved wheel grinder of inexpensive manufacture which is capable of smoothing out uneven treads of the wheels of rail transportation rolling stock, including engines, in a minimum of time with a minimum removal of metal without dismantling the wheels from the rolling stock.

Another important object of our invention is to provide an improved wheel grinder of the indicated nature which is additionally characterized by its capability of performing its specified functions without the necessity of the application of a liquid coolant at the grinding zones and which rapidly dissipates the relatively low heat generated in grinding.

A still further object of the present invention is to provide an improved wheel grinder of the aforementioned character which, because of its operative and installation features, can be used in tandem on the front and rear trucks of railway and transit cars to smooth the tread of all eight car wheels simultaneously.

Other objects of our invention, together with some of the advantageous features thereof, will appear from the following description of a preferred embodiment of the invention which is illustrated in the accompanying drawings. It is to be understood, however, that we are not to be limited to the precise embodiment shown, nor to the precise arrangement of the various components thereof, as our invention, as defined in the appended claims, can be embodied in a plurality and variety of forms.

Referring to the drawings.

In its preferred form, the improved wheel grinder of our invention, for smoothing the uneven tread of a car wheel on a railway car, a transit car or an engine without removing the car wheel therefrom, preferably comprises means for supporting the car wheel above the rails on which it normally rides, means for rotating the thus supported car wheel, together with a rotatable abrasive belt, means for rotating said belt, means for moving said rotating abrasive belt into engagement with the uneven tread of the rotating car wheel, means for preventing said rotating abrasive belt from following the contour of the uneven tread of the rotating car wheel, means for moving said belt horizontally in relation to the rotating car wheel, and means for tensioning said rotating belt at will.

While most of the grinding of car wheels is, generally, upon the treads of the car wheels, it is to be understood that our improved wheel grinder will function to fair in the radius of the tread thereby smoothing the ground tread at the juncture of the tread and the flange of the car. The term "fair in" means the removal of any edges, shoulders or depressions in the tread at the juncture thereof with the wheel flange that might result from the grinding of the treads per se.

Figure 1:
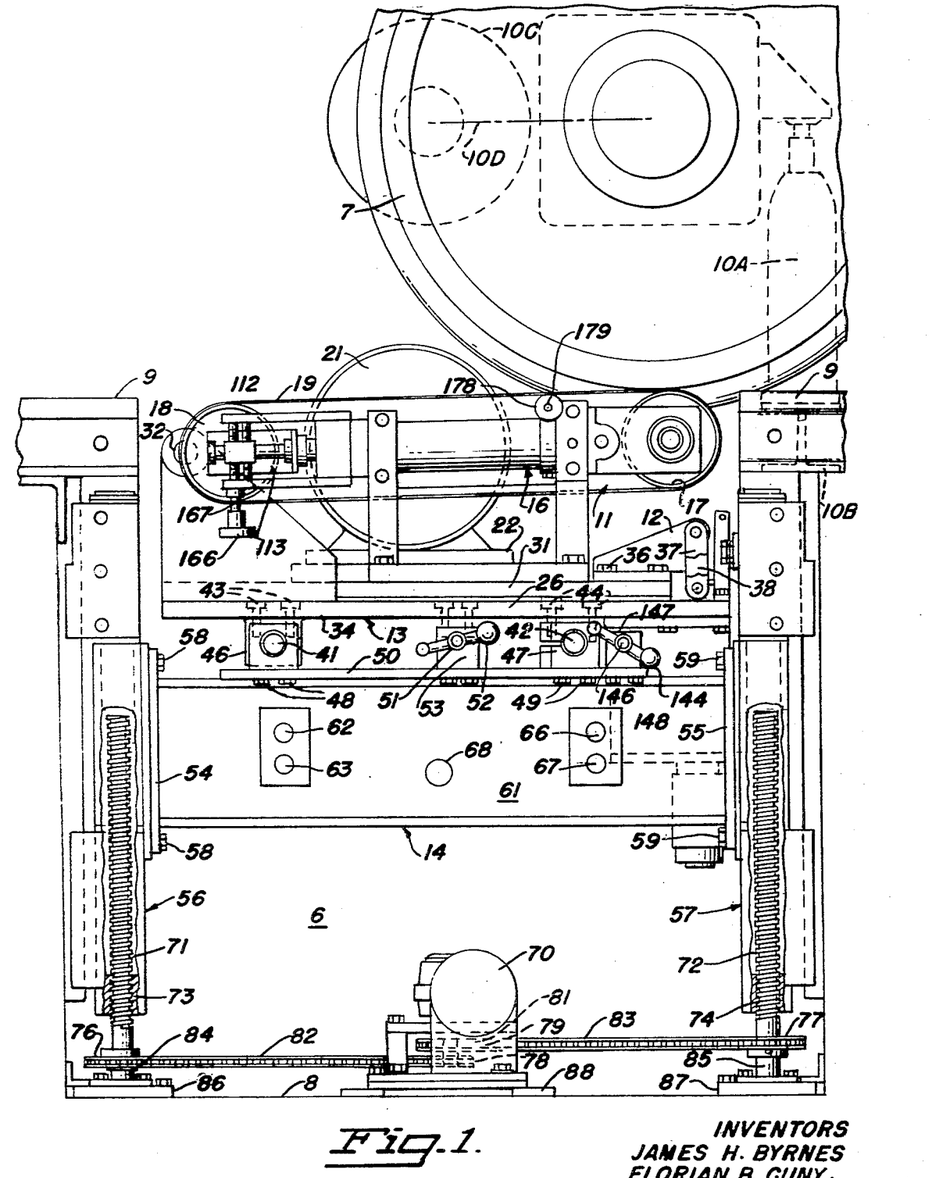
FIG. 1 is a front elevational view of a preferred embodiment of the invention illustrating the wheel-engaging position of the grinding component.

As will appear from the annexed drawings and the following description, our improved wheel grinder operates from underneath the rails on which transit cars ride. Accordingly, preliminary work is required for proper installation of one or more of our wheel grinders, depending upon the number of car wheels which are to ground. In FIG. 1, we have illustrated our invention in connection with the grinding of a single car wheel, but it is to be understood that one wheel grinder can be set up under or at one side of each of the four car wheels of each truck of a standard transit car which normally travels on rails so that, if desired, eight of our improved car wheel grinders can be assembled and installed for simultaneous operation and grinding of eight car wheels, as schematically illustrated in reduced showing in FIG. 10 of the accompanying drawings. The required preliminary work for the installations includes the provision of a suitable pit 6 of proper dimensions including depth for receiving the desired number of wheel grinders of our invention, together with accessory equipment, for effecting the grinding of either one car wheel 7, or any additional number of such car wheels up to the total of eight thereof simultaneously. We preferably form pit 6 with a horizontally level floor 8 at a depth sufficiently below the rails 9 for accommodating our wheel grinder or series of wheel grinders as the case may be. In the preliminary work, the trucks 10 in which the car wheels ar journaled, are lifted from the rails 9 and supported on suitable jacks, 10A, see FIG. 1 of the annexed drawings which conveniently may be mounted on beams 10B laid across the rails 9. Moreover, to complete the preparatory work, sections of the rails 9 immediately above the location of each wheel grinder are removed to permit the elevation of the wheel grinding components of our improved wheel grinder into close proximity to the raised car wheel. Suitable motors, as indicated at 10C in FIG. 1, together with electrical connections between the motors and a source of electrical energy, as well as driving connections between the motors and each car wheel, as indicated by dash line 10D, are provided for rotating each car wheel 7 during grinding operations at a speed of approximately 0 to 60 r.p.m., which is not critical as effective grinding can be accomplished at lesser or greater speeds.

In accordance with our invention, our improved wheel grinder comprises as essential elements, an abrasive belt assembly which is designated generally by the reference numeral 11 in the annexed drawings, a contact wheel pressure applicator 12 for pressing the contact wheel against the work which in the present embodiment of our invention is a car wheel to be ground, an upper or belt mounting unit 13 on which the belt assembly 11 is pivotally mounted, and a lower or supporting unit 14 upon which the upper or belt mounting unit is movably mounted for effecting adjustment horizontally in respect to the work. That is to say, to bring the abrasive belt assembly 11 either toward or away from the work being ground in horizontal movement.

Figure 6:
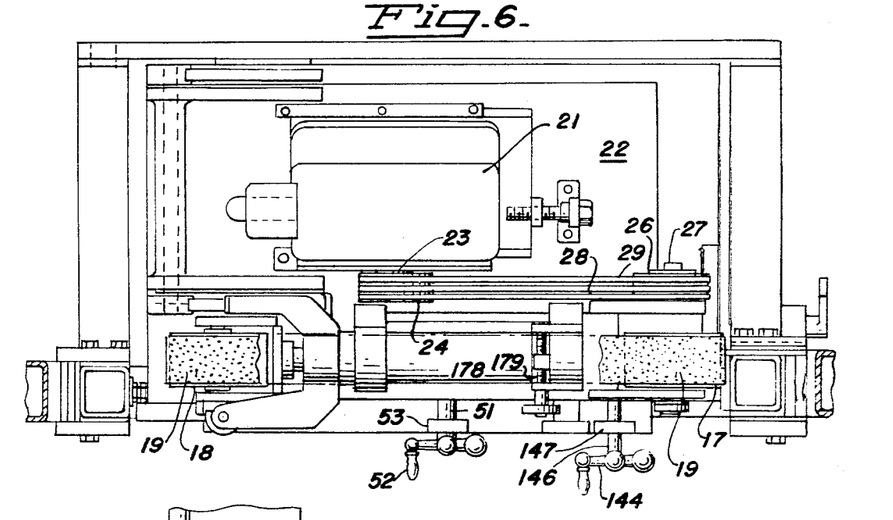
FIG. 6 is a top plan view of the abrasive grinding belt component, together with driving means therefor, of the preferred embodiment of our invention.

As illustrated in FIG. 1 of the accompanying drawings, the abrasive belt assembly 11 comprises a generally tubular structure 16 in which are journaled a contact wheel 17 and an idler wheel 18 over which an abrasive belt 19 is trained. The abrasive belt 19, per se, is not a part of the present invention, such belt being a conventional grinding belt fabricated of closely woven cloth to which is bonded an abrasive such as either aluminum oxide or silicon carbide or the like. A suitable motor 21, see FIG. 6, is mounted on an elevated frame 22 at the level of the abrasive belt assembly 11 for driving the abrasive belt 19, the drive shaft 23 of the motor carrying a sheave 24 which is in alignment with a sheave 26 carried on the shaft 27 on which the contact wheel 17 is mounted, and the driving connection between the motor 21 and the contact wheel 17 being conveniently effected by a pair of endless belts 28 and 29 which are trained over the sheaves 24 and 26, as shown. The motor 21 is connected into an electrical circuit hereinafter explained.

In accordance with our invention, the upper or belt mounting unit 13 carries a pivot plate 31 upon which the abrasive belt assembly 11 is mounted for slight pivotal movement upwardly and downwardly in respect to the work being ground by means of a pivot pin 32 which is carried on an extension of the plate 31 at the top of the upper unit 13. All as illustrated in FIG. 1. To effect the upward swinging of the abrasive belt assembly 11 on its pivot 32 and thereby to bring the contact wheel 17 with its abrasive belt 19 into engagement with the tread or other portion of a car wheel 7 to be ground, we preferably provide the pneumatic means hereinafter described for actuating the contact wheel pressure applicator 12 to raise the same as well as to raise the pivotally mounted frame 31 to which applicator 12 is attached by means of the bolts 36. Linkage between the pneumatic means and the applicator 12 includes the pivotally connected links 37 and 38, see FIG. 1.

In order that the grinding belt 19 can be moved with precision toward the work so that portions of a car wheel 7 other than the periphery of the flange of the wheel can be ground to a smooth surface, we provide means for effecting horizontal movement of the upper or belt supporting member 13 relative to the lower or supporting unit 14. To this end, we provide a pair of transversely extending shafts 41 and 42 which are arranged in spaced relationship to one another and extend through ball bushing blocks, not shown, depending from plate 34 of the upper unit 13 and secured thereto by means of counter-sunk metal screws 43 and 44, as shown in dotted lines in FIG. 1. The shafts 41 and 42 are supported at the rear as well as at the front of the lower unit 14 by shaft clamps of which the front clamps 46 and 47 only are shown. By means of the ball bushings sliding on the fixed shafts 41 and 42, the upper unit 13 can readily be moved horizontally toward and away from the work. The shaft clamps are fixedly secured for sake of rigidity by means of screw bolts 48 and 49 which extend through the plate 50 which is secured to the lower unit 14. Hand crank means are provided for effecting such horizontal movement of the upper unit 13 on the lower unit 14, such hand crank means including a third transversely extending shaft 51 on which a hand crank 52 is secured at its forward end for easy access by an operator; such shaft 51 being mounted in suitable blocks at the rear and front of the upper unit 13 of which blocks only the front block 53 is shown. The shaft 51 is threaded on its inner end, not shown, for threadedly engaging the interior threads of a cavity formed in the rear mounting block, all not shown, so that when the hand crank 52 is turned in one direction of rotation the upper unit 13 will be moved toward the work on a horizontal sliding movement on shafts 41 and 42, while turning of the hand crank 52 in the opposite direction of rotation, will move the upper unit 13 back from the work.

In accordance with the present invention, lower unit 14 of our improved wheel grinder is fashioned conveniently from an I-beam and is provided with integral end flanges 54 and 55 extending above and below a central web; such unit 14 being fixedly secured to side supporting hollow columns 56 and 57, arranged at opposite sides of the units 13 and 14, by means of screw-bolts 58 and 59 which pierce the flanges and the columns. The lower unit 14 defines a front panel 61 in which push-buttons are movably mounted for ready access to an operator, such as push-buttons 62 and 63 for starting and stopping the motor 20 which drives the abrasive belt 19, and the push-buttons 66 and 67 for actuating the pneumatic means hereinafter described for raising and lowering the pressure applicator 12 controlling the grinding pressure of the belt on the work, together with a push and pull valve 68 for controlling the tensioning of the abrasive belt 19 whenever desired.

Means are provided for raising the two units 13 and 14 of our improved wheel grinder as an entity to the level of the rails 9 on which the transit car having wheels to be ground normally rides, as well as lowering the two units as an entity into the pit 6, thus enabling the abrasive belt 19 to be readily brought into proximity to the work, as well as into engagement with the surface to be ground. While any suitable lifting or elevating means can be employed, we preferably use electro-mechanical means including a reversing motor 70 which is connected into an electrical circuit hereinafter described, together with a pair of jacks 71 and 72 and associated nuts 73 and 74, respectively, which are fitted into the side supporting columns 56 and 57 and having their threads meshing with interior threads, not shown, of such rods. The elevator means also include a pair of sprocket wheels 76 and 77 which are fixedly secured on the jacks 71 and 72, respectively, as well as driven sprocket wheels 78 and 79 which are secured on a driven shaft 81 connected to the drive shaft, not shown, of reversing motor 70; together with an endless chain 82 which is trained around the two sprocket wheels 76 and 78, as well as an endless chain 83 which is trained around the two sprockets 77 and 79 to complete the driving connections between the motor 70 and the two jacks 71 and 72 thereby enabling, upon the rotation of motor 70 in one direction of rotation, the rotation of the two jacks to raise the units 13 and 14 together to the level of the rails 9. The rotation of motor 70 and the connected jacks 71 and 72 in the opposite direction of rotation will lower the two units 13 and 14 as an entity back into the pit again. As shown at the bottom of FIG. 1 of the accompanying drawings, the jacks 71 and 72 are conveniently journaled in suitable bushings 84 and 85, respectively, which are bolted to foundation plates 86 and 87, respectively. A foundation plate 88 also is provided for reversing motor 70 and is seated on the floor 8 of pit 6 along with the foundation plates 86 and 87 for the side columns 56 and 57, respectively, of the grinding machine.

Figure 2:
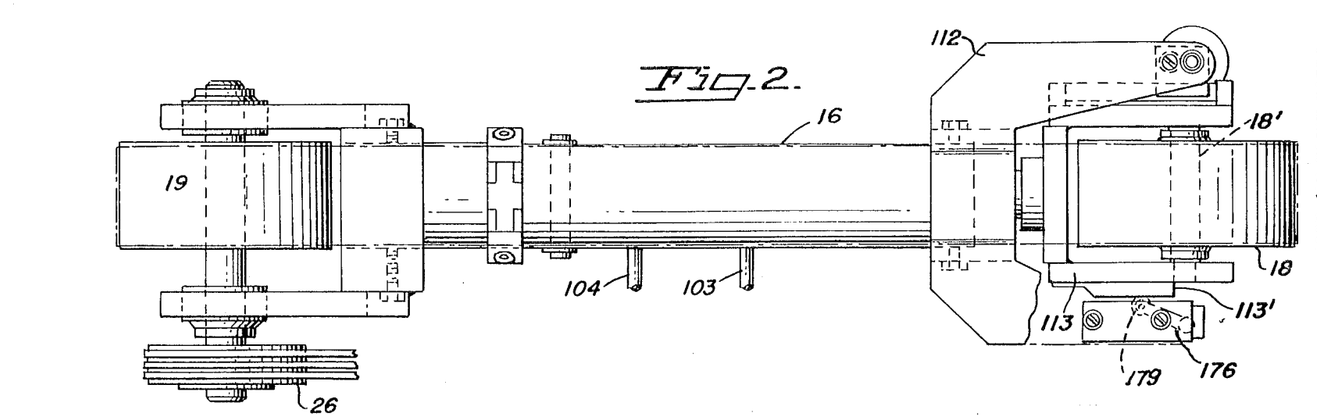
FIG. 2 is a top plan view of the grinding belt component of the preferred embodiment of our invention, with associated drive means therefor and belt tensioner.
Figure 3:
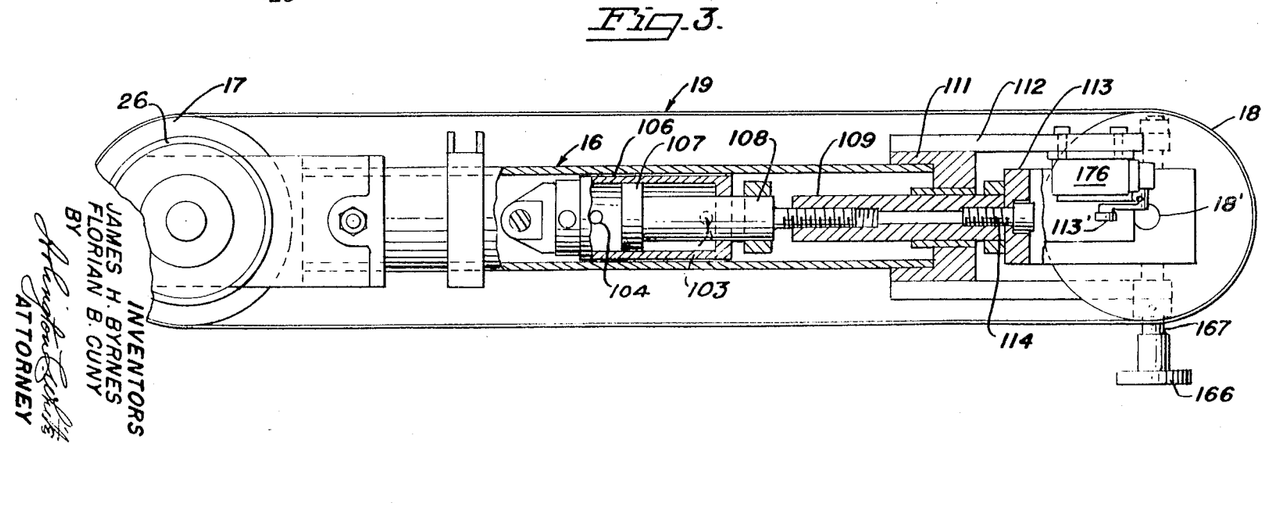
FIG. 3 is a side elevational view, partly broken away and partly in section, of the component shown in FIG. 2.

In accordance with the present invention, we provide pneumatic means and equipment for not only effecting the tilting of the upper unit 13 containing the abrasive belt assembly 11 on its pivot 32 to bring the contact wheel 17 into proximity with the tread of car wheel 7 for a grinding operation, but also for effecting a tensioning of the abrasive belt 19 whenever desired. The pneumatic means and equipment comprises two air rams for effecting the two aforementioned objects in respect to the contact wheel 17 and abrasive belt 19, and includes an air compressor 91, see FIG. 12 of the annexed drawings, for supplying air under pressure through a conduit 92 containing an air filter 93 to the diverging air lines 94 and 95 through regulators 96 and 97, respectively, to the two air rams hereinafter more particularly described. For tensioning the abrasive belt 19, we provide in the pneumatic control a four way valve, not shown, in a valve body 98 which is placed in communication with the supply line 94 through a by-pass line 99, and we also provide a pilot valve for controlling the operation of the four way valve through the manipulation of push and pull knob 68; such pilot valve being contained in a valve body 101 which is in communication with valve body 98 through lines 102 and 102'. The pneumatic system for tensioning the belt 19 includes branch air supply lines 103 and 104 leading from the four way valve body 98 to opposite ends of a cylinder 106 for introducing air under constant pressure into the cylinder on opposite sides of a piston 107 which is slidably mounted therein and constituting one of the above mentioned two air rams in the pneumatic system; the threaded stem 108 of piston 107 being threadedly connected, see FIG. 3, to an interiorly threaded sleeve 109 which is slidably carried in the tubular structure 16 of the abrasive belt assembly 11 by means of a bushing 111 secured and retained on a fixed member 112 to a yoke 113 which carries the shaft 18' of the idler wheel 18. A short threaded bolt 114, which is threadedly connected to the opposite interiorly threaded end of sleeve 109 serves to retain the sleeve in horizontally disposed position on the yoke 113, see FIGS. 2 and 3 of the annexed drawings. When push knob 68 is pushed inwardly to start the supply of air under pressure through the valve bodies 101 and 99 and through air line 104 to cylinder 106 in back of piston 107 therein, the constant air pressure will, through piston stem 108, cause movement of sleeve 109 to bring the idler wheel 18 into contact with belt 19 and thereby tension the same. Pulling out of the push and pull knob 68 will reverse the flow of air under pressure through the four way valve in valve body 98 to introduce air under pressure through air line 103 to the opposite end of cylinder 106 to withdraw the sleeve 109 connected to piston stem 108, and relieve the tension on belt 19. Excess air is relieved from valve body 98 on each reversal of the supplied air through flow control valves 117 and 118 contained in the vent lines 117' and 118', respectively, communicating with the interior of valve body 98.

Figures 4, 5, 10:
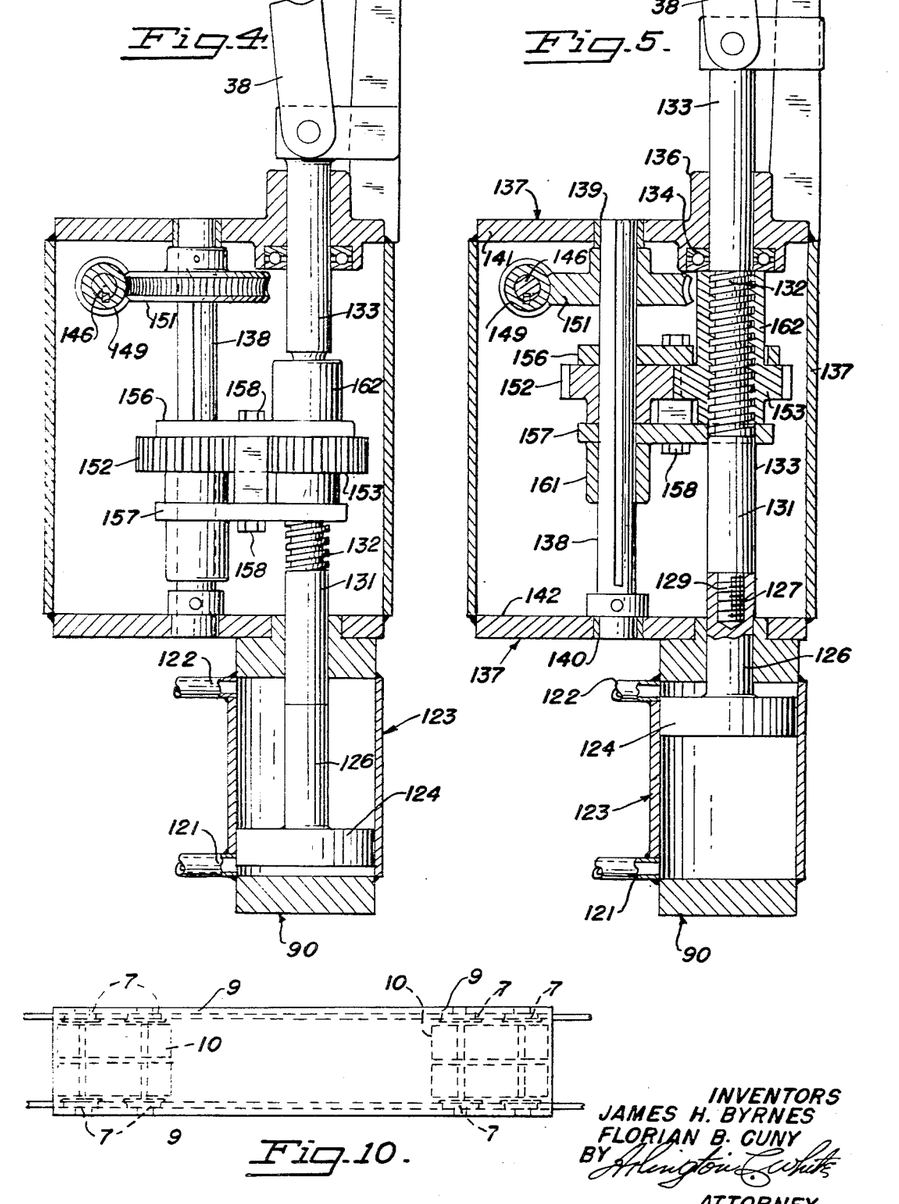
FIG. 4 is a sectional elevational view of the lifting unit including operating mechanism therefor; this view showing the lifting unit in its lowered position.
FIG. 5 is a view similar to FIG. 4 but showing the lifting unit in extreme raised position.
FIG. 10 is a schematic reduced view of eight embodiments of the invention in operative positions for simultaneously smoothing the treads of all eight car wheels of a transit or railway car while in positions on the axles of the trucks of the car.

As hereinabove stated, the pneumatic means and equipment includes an air ram for effecting the tilting of the pivot plate 31 as well as the abrasive belt assembly 11 to bring the contact wheel 17 and abrasive belt 19 into near engagement with the car wheel 7 and to hold the same in such position as long as desired. To this end we provide a four way valve, not shown, in a valve body 120 which receives a supply of air under pressure from air compressor 91 through air line 95 and which serves to supply such air under pressure through air lines 121 and 122 to opposite ends of a vertically disposed cylinder 123 in which a piston 124 is slidably mounted for reciprocation therein, thus affording a second air ram in the pneumatic system. Thus, air introduced through air line 121 in back of piston 124 will move the piston to the upper end of the cylinder 123 and hold it there, while air introduced into the cylinder on the opposite side of piston 124, through air line 122, will move the piston 124 to the lower end of cylinder 123 and hold it there. The stem 126 of piston 124 projects from the cylinder 123 and is formed at its extreme outer end with a threaded socket 127 for threadedly receiving the lower threaded end 129 of a shaft 131. As shown in FIGS. 4 and 5 of the annexed drawings, the shaft 131 is slidably mounted in a bushing 136, and slides in relation to its housing or case 137 as well as in relation to a rotatable shaft 138 supported vertically in top and bottom bushings 139 and 140, respectively, fitted to the top and bottom walls 141 and 142, respectively, of the case 137; such mountings of the rotatable shaft 138 permitting rotation thereof as a part of feed mechanism for bringing the abrasive belt 19 into engagement with the car wheel 7 which, when supported above the rails is freely rotatable in respect to the rails 9.

In addition to the air ram 123 and its above described attendant components for tilting the frame 31 containing the abrasive belt assembly 11, and thus to bring the contact wheel 17 and abrasive belt 19 in near engagement with the portion of the car wheel 7 to be ground, we provide manually operable feed mechanism and assorted gearing to control the upper and lower limit of the stroke of the air ram 123 and thus to control the grinding operation precisely. These manual operable feed means comprise a hand crank 144 which is secured to a rotatable shaft 146 supported in suitable rear and front bushings, of which a front bushing 147 is shown in FIG. 1, which are fastened by means of bolts 148 to the horizontally disposed plate 50 on the lower unit 14 of the grinder; such mounting of the crank 144 at the front of the machine making it readily accessible to the machine operator for turning in either direction to rotate shaft 146 in either one or the other direction of rotation.

To complete the feed mechanism for the abrasive belt 19 for precision grinding under pressure, it will be observed from a study of FIGS. 4 and 5 that the rotatable shaft 146 extends through the rear wall of the case 137 and carries on its inner end a small worm gear 149 which is arranged for meshing engagement with a gear 151 fixedly secured on shaft 138. Turning of the hand crank 144 will thereby effect the turning of the shaft 138 in both directions of rotation. It will also be observed that shaft 138 carries a gear 152 which is slidably keyed to the shaft and arranged for constant meshing engagement with a gear 153 on shaft 131. The gear 153 contains an interiorly threaded bushing 162 which engages a threaded portion 132 of shaft 131. Consequently, rotation of shaft 138 by manipulation of hand crank 144 of the belt feeding mechanism will effect rotation of the gear 153 along the threaded portion 132 of shaft 131. The two constantly meshing gears 152 and 153 are tied together on their shafts 138 and 131, respectively, and such joinder of such gears conveniently can be a pair of opposed plates 156 and 157 disposed on opposite sides, top and bottom, of the gears 152 and 153 and spanning the same, together with a through bolt 158 for clamping the two plates together in operative positions. The raising and lowering or up and down movement of the connected gears 152 and 153 is in response to the movement of the piston 124 of the air ram 123. In this up and down movement, the top of the threaded bushing 162 serves as a stop to control the stroke of the air ram 123 since the upward movement of shaft 131 is limited by the abutment of the top of the bushing 162 with the bottom of the bearing 134. And since the shaft 131 is connected through the links 38 and 37 to the contact wheel pressure applicator 12 which is bolted to the frame 31 carrying the pivot 32, see FIG. 1, the contact wheel 17 with its overlying abrasive belt 19 is moved into engagement or out of engagement with the surface to be ground on the rotating car wheel 7. In other words, the stop made between the top of threaded bushing 162 and the bearing 134 controls the up position of the pivot plate 31 of upper unit 13 and the contact wheel 17. Lowering of the stop with the hand crank 144 effects a raising of the pivot plate and the contact wheel but since the contact wheel 17 cannot move higher than the stop permits, the grinding cannot follow the contour of the out-of-round car wheel 7. And since the car wheel is turning on its own axle in its own bearings, during the grinding operation, the grinding creates a smooth surface on the tread of the car wheel concentric with its own bearings for engaging the rails 9 in normal railway car, engine, or transit car operations.

Figure 9:
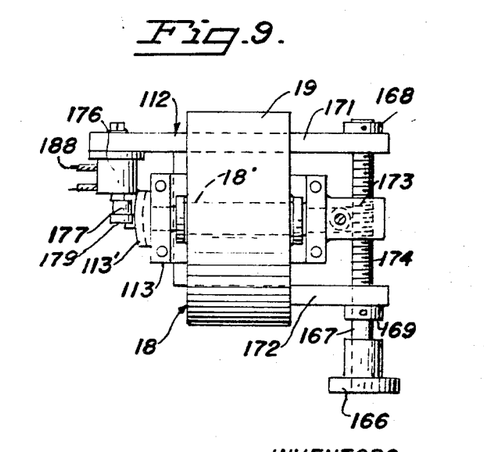
FIG. 9 is an end elevational view of a preferred embodiment of the invention; this view showing the means for centering the abrasive grinding belt in relation to its drive members.

In order that the abrasive belt 19 may be properly centered in respect to the peripheries of the contact wheel 17 and idler wheel 18, we provide means including the hand knob 166, see FIG. 9 of the drawings, for drawing the abrasive belt in one direction or the other across or in respect to such peripheries. The hand knob 166 is fixedly mounted on a vertically disposed rotatable stub shaft 167 which is journaled in bushings of collars 168 and 169 secured on the shaft to abut opposed sides of arms 171 and 172 of the fixed member 112 which encircles the tubular structure 16 of the abrasive belt assembly 11. The shaft 167 is threaded for threaded engagement with interior threads, not shown, of a sleeve 173 slotted to engage a bar 174 affixed to yoke 113 which contains shaft 18' of the idler wheel 18. Rotation of hand knob 166 in one direction of rotation will twist the yoke 113 and shaft 18', together with the wheel 18, slightly in one direction about the axis of the tubular structure 16, while rotation of the knob 166 in the opposite direction will twist the yoke 113, together with shaft 18' and wheel 18 slightly in the opposite direction about the axis of the tubular structure 16, thus centering the belt 19, if out of center, in respect to the width of the peripheries of the wheels 17 and 18.

Figures 11, 12:
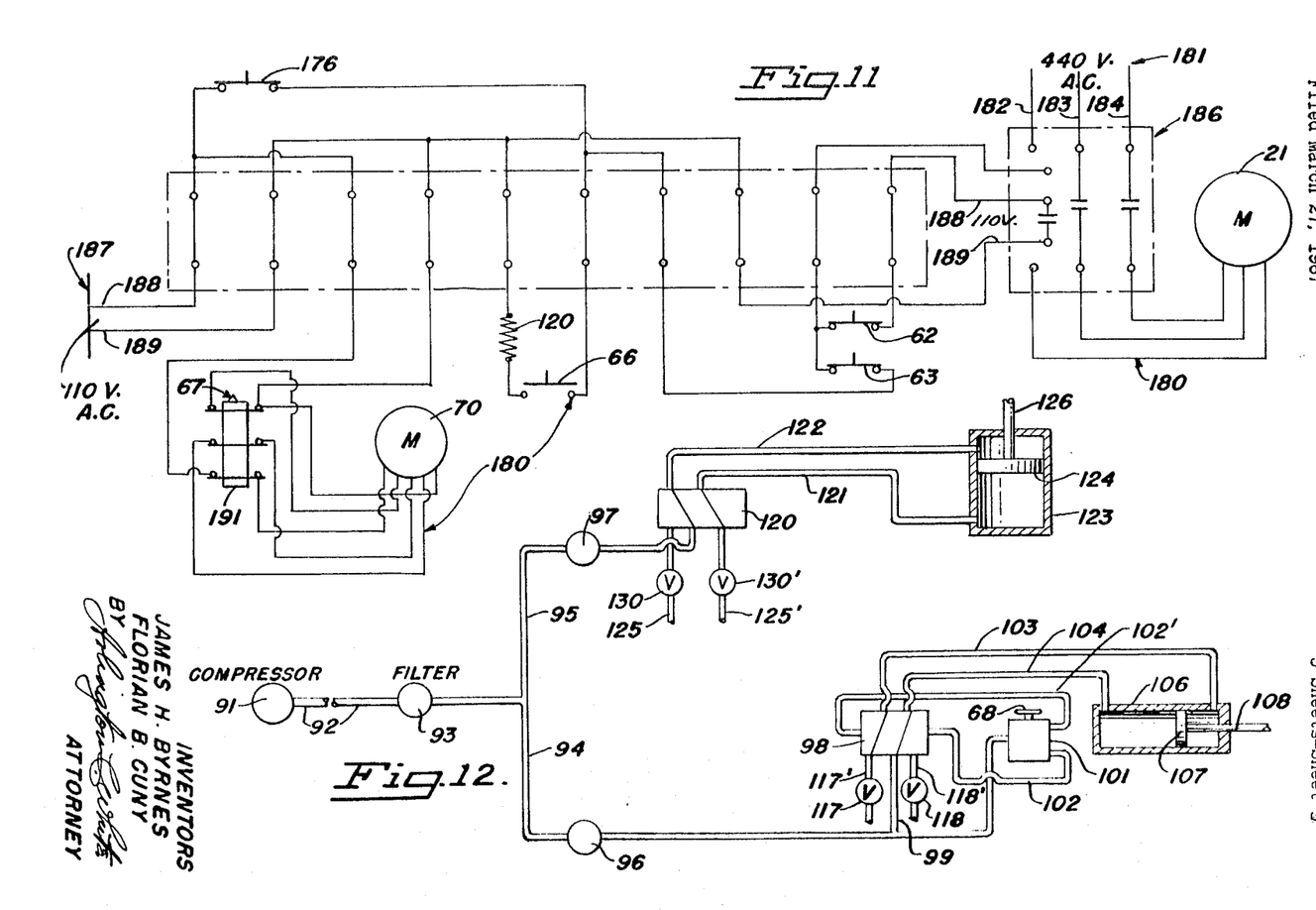
FIG. 11 is a diagrammatic view of an electrical circuit employed in a preferred embodiment of the invention.
FIG. 12 is a diagrammatic view of a pneumatic system employed in a preferred embodiment of the invention.

In the event an abrasive belt 19 breaks during a grinding operation, the air pressure in air ram 106 forces the yoke 113 to extend to a point where a cam plate 113' on the yoke will open a limit switch 176, through the release of a spring-actuated valve 177 by the engagement therewith of such cam plate 113', to cause the grinder motor 21 to stop and at the same time to actuate the solenoid valve 120 and thereby cause air under pressure to flow through air line 122 to the opposite side of the piston 124 and move it to the opposite end of the air ram or cylinder 123, with excess air exhausted or vented to the atmosphere through the flow control valve 130 in line 125, see FIG. 12, communicating with the valve body 120. This will withdraw air pressure on the pivot plate 31 through the connections between the piston stem 126, the shaft 131, the links 38 and 37 and the contact wheel pressure applicator 12, and thus withdraw contact wheel 17 from the car wheel 7. The view of FIG. 4 shows the air ram 123 in its lowered position with link 38 withdrawn, while FIG. 5 shows such air ram raised to raise link 38 and its associated elements including pivot plate 31.

Figure 7:
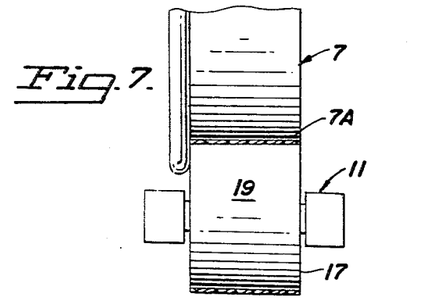
FIG. 7 is an enlarged fragmentary detail illustrating the right angle engagement of the abrasive grinding belt with a car wheel having a flat or cylindrical tread.
Figure 8:
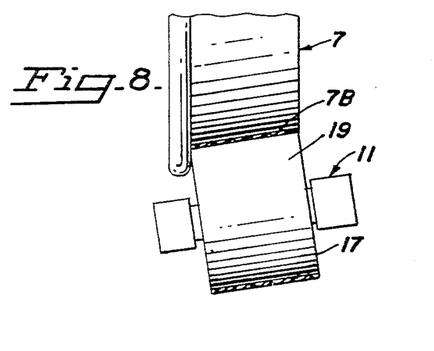
FIG. 8 is a view similar to FIG. 7 but showing the abrasive grinding belt tilted for right angle engagement with the tapered tread of a car wheel.

In FIGS. 7 and 8 of the annexed drawings, we have illustrated, respectively, the grinding position of the abrasive belt 19 in relation to a flat tread 7A of car wheel 7, and the grinding position of the abrasive belt 19 in relation to a tapered tread 7B of a car wheel 7, thus showing in the latter case the tilted abrasive belt assembly 11 to accommodate for tapered treads. To effect this tilting of the abrasive belt assembly 11 from a horizontal axis to an inclined axis, we provide a hand knob 178 which is fixedly mounted on a shaft 179 rotatably mounted in front and rear struts, not shown, of the upper unit 13, with the inner end of the shaft 179 in bearing arrangement with the rear strut so that upon turning of the knob 178 in one direction of rotation, the rotation of shaft 179 will cause the abrasive belt assembly 11 and contact wheel 17 to be tilted away from the horizontal to a position where the axis of the contact wheel shaft 27 is at an incline, to meet or accommodate for the incline of the tapered tread 7B of the car wheel to be ground and smoothed. Rotation of hand knob 178 in the opposite direction of rotation will bring the axis of the shaft 27 of the contact wheel 17, and the entire assembly 11 back to horizontal position again for the grinding of flat treads 7A of car wheels.

While any suitable electrical circuit may be employed for operating the electrical components above described to effect movements of the grinder elements, we preferably utilize the electrical circuit which is diagrammatically shown in FIG. 11 of the annexed drawings. This electrical circuit, designated generally by the reference numeral 180, derives its energy from a source of 440 volt-60 cycle alternating current on a 3 phase distribution system, indicated at 181 and consisting of the lines 182, 183 and 184 connected through a conventional magnetic starter 186 to grinder motor 21 for driving the contact wheel 17 and abrasive grinder belt 19, the magnetic circuit in the starter being connected into an auxiliary electrical circuit deriving its energy from a 110-volt alternating current source, indicated at 187 and comprising two supply lines 188 and 189. The magnetic circuit in the starter 186 is controlled through the switches 62 and 63 connected into the supply line 188 through the limit switch 176 and supply line 189 of the auxiliary 110 volt alternating current circuit. A drum switch 191 leading to elevator motor 70 is connected across the 110 volt supply lines 188 and 189.

It will be noted from the foregoing description of our improved wheel grinder, and from the accompanying drawings that with the abrasive belt 19 in motion and in engagement with the tread 7A or 7B of a car wheel 7 in place on its axle and being rotated, the grinder is capable of regrinding wheel treads truly concentric with the wheel bearings. Moreover, it is capable of grinding a pair of wheels on the same axle simultaneously using, of course, two of the preferred embodiments of our invention heretofore described, at the same time, one on each wheel. As indicated and as shown in FIG. 10, it is equally possbile, using eight grinders simultaneously, to grind the treads of all eight car wheels on two trucks of a transit car while the wheels are in place on their axles and while each is being freely rotated above the car rails on which the wheels normally ride. By virtue of the dual-acting manually controlled feed mechanism for advancing and retracting the rotating contact wheel 17 with its overlying abrasive belt 19, together with the pneumatically operated means for applying and maintaining pressure on such contact wheel during grinding operations, all as hereinabove described, the required rounding of the car wheel treads is accomplished to a roundness concentric with the bearings of the car wheels. Our improved grinder does not cut deeply into the car wheel tread, but the abrasive belt 19 smooths out in a minimum amount of time all flat spots on the tread by taking off only enough metal to round the wheel tread.

Should it become necessary to reduce the diameter of a car wheel flange, as distinguished from a car wheel tread, the abrasive belt assembly can be positioned under the flanged first, to grind off sufficient metal to bring the flange diameter within or to the required size, and second tilting the abrasive belt assembly 11 to round off any sharp edges.

The present embodiment of our wheel grinder is economical to operate in that it does not generate appreciable heat and can thus be run dry without the necessity of utilizing expensive and messy liquid coolant systems. Because of the use of an abrasive belt as the grinding element instead of a cutting tool used in prior machines, the tread of the car wheel is not appreciably reduced on each grinding operation and, accordingly, the car wheel will have increased longevity when the rounding thereof is accomplished with our improved wheel grinder. Moreover, because the improved grinder of our invention per se does not perform the function of lifting the railway car or engine and hold the same above the rails so that car wheels or engine wheels to be ground can be freely rotated in respect to and above the rails, as is the case of all prior wheel grinding equipment which grinds wheels while in place on their axles, our improved grinder is much lighter in weight, is inexpensive to manufacture and its function is solely that of grinding the car wheel treads, or flanges, and recontouring the wheel to a roundness of tread concentric with the bearings of the wheels in which they are journaled.

It is to be understood that the appended claims are to be accorded a range of equivalents commensurate in scope with the advances made over the prior art.

We claim:
1. In combination with the tread of an overlying freely rotating railway car wheel concentric with the shaft bearings in which the car wheel is journaled, a wheel grinder movably mounted below said freely rotating car wheel which is above the rails upon which it normally rides, means for lifting said grinder to rail level, a pivotally mounted abrasive belt assembly on said grinder; said assembly comprising a tubular structure, a contact wheel journaled in said tubular structure at one end thereof, an idler wheel journaled in said tubular structure at the opposite end thereof, and an abrasive belt trained over said contact wheel and said idler wheel, means for rotating said contact wheel and said abrasive belt, and means for pivoting said assembly to lift said contact wheel and said abrasive belt into engagement with the tread of said overlying freely rotating railway car wheel and simultaneously applying pressure upon said contact wheel to pressure-grind the tread of said overlying freely rotating railway car wheel to a roundness concentric with the shaft bearings in which said railway car wheel is journaled.

2. The combination defined in claim 1, wherein said means for applying pressure upon said contact wheel is pneumatically controlled.

3. The combination of claim 1, and means for moving said tubular structure on a horizontal axis towards and away from the flange of said freely rotating railway car wheel.

4. The combination of claim 1, and means for controlling the amount of material removed from the tread of said freely rotating railway car wheel during grinding operations.

5. The combination of claim 1, and means for centering said abrasive belt on said contact wheel.

6. The combination of claim 1, and means for tilting said abrasive belt assembly in relation to the flange of said overlying railway car wheel.

7. The combination of claim 1, and means for tensioning said abrasive belt on said contact wheel.

8. In combination with a plurality of overlying freely rotating railway car wheels all supported above the rails upon which said car wheels normally ride and with the treads of all of said wheels concentric with the bearing shafts in which they are journaled, a plurality of separately operable wheel grinders each movably mounted below the rails, means for lifting each of said wheel grinders to rail level, an abrasive belt assembly pivotally mounted on each of said wheel grinders; said assembly comprising a driven contact wheel, and an abrasive belt trained thereover, means for rotating said contact wheel and said abrasive belt, and means for pivoting each of said assemblies on each of said grinders to bring said contact wheels and said abrasive belts into grinding engagement with the treads of said overlying freely rotating railway car wheels and simultaneously applying and maintaining pressure on said contact wheels whereby all of said grinders will simultaneously pressure-grind the treads of all of said freely rotating railway car wheels to a roundness concentric with the shaft bearings in which they are journaled.

9. The combination defined in claim 8, wherein the applied pressure on said contact wheels is pneumatically controlled.

10. The combination of claim 8, and means for moving said tubular structure of each of said grinders on horizontal axes toward and away from the flanges of said freely rotating car wheels to smooth the treads thereof on radii from the outer limits of the treads to the flanges of said railway car wheels.

11. The combination of claim 8, and means for controlling the amount of material removed from the treads of said car wheels during grinding operations.

12. The combination of claim 8, and means on each of said grinders for centering said abrasive belts on said contact wheels.

13. The combination of claim 8, and means for tensioning each of said abrasive belts on each of said contact wheels.

14. The combination of claim 1, and means for preventing said contact wheel from following the contour of an out-of-round tread on said freely rotating railway car wheel.

15. The combination of claim 8, and means for preventing said contact wheels from following the contours of out-of-round treads of said plurality of overlying freely rotating railway car wheels.

References Cited

UNITED STATES PATENTS

| | | | |
|---|---|---|---|
| 2,561,589 | 7/1951 | Newton | 51—147 |
| 2,624,158 | 1/1953 | Hendrickson. | |
| 2,644,278 | 7/1953 | Collins | 51—142 |
| 2,841,927 | 7/1958 | Barnes | 51—147 X |

HAROLD D. WHITEHEAD, Primary Examiner

U.S. Cl. X.R.

51—104; 51—145